United States Patent
Taylor

(10) Patent No.: US 9,919,820 B2
(45) Date of Patent: Mar. 20, 2018

(54) FILM DRIVE ASSEMBLY FOR A PACKAGING MACHINE

(71) Applicant: TNA Australia Pty Limited, Homebush Bay (AU)

(72) Inventor: Alfred Alexander Taylor, Lugarno (AU)

(73) Assignee: TNA Australia Pty Limited, Lidcombe, New South Wales (AU)

( * ) Notice: Subject to any disclaimer, the term of this patent is extended or adjusted under 35 U.S.C. 154(b) by 642 days.

(21) Appl. No.: 14/506,344

(22) Filed: Oct. 3, 2014

(65) Prior Publication Data

US 2015/0135654 A1 May 21, 2015

(30) Foreign Application Priority Data

Nov. 19, 2013 (AU) ................................ 2013904471
Dec. 20, 2013 (AU) ................................ 2013904995

(51) Int. Cl.
| | |
|---|---|
| B65B 9/20 | (2012.01) |
| B65B 9/207 | (2012.01) |
| B65B 9/22 | (2006.01) |
| B65B 51/30 | (2006.01) |
| B65H 20/06 | (2006.01) |

(Continued)

(52) U.S. Cl.
CPC ........... *B65B 9/2028* (2013.01); *B65B 9/207* (2013.01); *B65B 9/22* (2013.01); *B65B 51/306* (2013.01); *B65H 20/06* (2013.01); *B29C 65/7894* (2013.01); *B29C 66/1122* (2013.01); *B29C 66/4312* (2013.01); *B29C 66/83513* (2013.01); *B29C 66/849* (2013.01);

(Continued)

(58) Field of Classification Search
CPC ..... B65B 9/067; B65B 9/2014; B65B 9/2021; B65B 9/2028; B65B 9/207; B65B 9/22; B65B 2009/063
USPC .................................................... 53/551, 552
See application file for complete search history.

(56) References Cited

U.S. PATENT DOCUMENTS 1,937,501 A * 12/1933 Aldrich ...................... B65B 9/12
493/103
3,664,088 A * 5/1972 Sherman ................... B65B 9/06
53/375.9

(Continued)

FOREIGN PATENT DOCUMENTS

| AU | 2012201494 A1 | 10/2012 |
|---|---|---|
| AU | 2012201595 A1 | 11/2012 |

(Continued)

OTHER PUBLICATIONS

Search report from corresponding Spanish divisional application No. 201630978 dated Feb. 16, 2017 (four pages).

(Continued)

*Primary Examiner* — Stephen F Gerrity
(74) *Attorney, Agent, or Firm* — Kilpatrick Townsend & Stockton LLP

(57) ABSTRACT

A packaging assembly (10) that includes a weighing machine (11) that delivers batches of product to a packaging machine (18). A film drive assembly (17) pulls strip bag material pass a former shoulder (41), to form tubular bag material into which batches of product are to be delivered, with the tubular bag material being longitudinally sealed, transversely sealed and transversely cut by the packaging machine (18).

19 Claims, 5 Drawing Sheets

(51) Int. Cl.
 B29C 65/78 (2006.01)
 B29C 65/00 (2006.01)
(52) U.S. Cl.
 CPC ...... *B65B 9/2021* (2013.01); *B65H 2404/261* (2013.01); *B65H 2701/191* (2013.01)

(56) References Cited

U.S. PATENT DOCUMENTS

| | | | |
|---|---|---|---|
| 3,796,021 A * | 3/1974 | Toss .................. | B65B 51/30 53/552 |
| 4,136,505 A * | 1/1979 | Putnam, Jr. et al. . | B65B 9/2028 53/551 |
| 4,291,520 A * | 9/1981 | Prince et al. ......... | B65B 51/303 53/374.6 |
| 4,430,844 A * | 2/1984 | James .................. | B65B 9/067 53/141 |
| 4,506,488 A | 3/1985 | Matt et al. | |
| 4,525,977 A | 7/1985 | Matt | |
| 4,620,409 A * | 11/1986 | McElvy .............. | B65B 9/2028 226/172 |
| 4,640,081 A | 2/1987 | Kawaguchi et al. | |
| 4,660,356 A * | 4/1987 | Simionato ........... | B65B 9/2028 53/389.5 |
| 4,663,917 A | 5/1987 | Taylor et al. | |
| 4,750,313 A | 6/1988 | Kammler et al. | |
| 4,753,336 A | 6/1988 | Taylor et al. | |
| 4,909,356 A * | 3/1990 | Rimondi et al. ...... | B65B 9/2028 177/50 |
| 4,910,943 A | 3/1990 | Taylor et al. | |
| 5,119,938 A | 6/1992 | Beckh et al. | |
| 5,255,495 A * | 10/1993 | Kovacs ................ | B65B 9/067 53/504 |
| 5,279,098 A | 1/1994 | Fukuda | |
| 5,313,766 A * | 5/1994 | Rimondi et al. ...... | B65B 9/2028 53/245 |
| 5,347,795 A * | 9/1994 | Fukuda ............... | B65B 9/2028 53/373.7 |
| 5,412,927 A * | 5/1995 | Miyazaki et al. .... | B65B 9/2028 53/374.3 |
| 5,622,032 A | 4/1997 | Ryan | |
| 5,685,132 A * | 11/1997 | Romijn et al. ......... | B65B 9/20 493/295 |
| 6,170,227 B1 * | 1/2001 | Kovacs et al. ....... | B31D 5/0073 53/375.9 |
| 6,655,110 B2 | 12/2003 | Taylor | |
| 7,063,500 B1 | 6/2006 | Takahashi | |
| 7,124,559 B2 | 10/2006 | Taylor | |
| 7,152,387 B2 | 12/2006 | Taylor | |
| 7,159,376 B2 | 1/2007 | Taylor | |
| 7,383,672 B2 | 6/2008 | Taylor et al. | |
| 7,415,809 B2 | 8/2008 | Taylor | |
| 7,472,528 B2 | 1/2009 | Taylor | |
| 7,600,630 B2 | 10/2009 | Taylor et al. | |
| 2002/0162305 A1 * | 11/2002 | Miyamoto et al. ... | B65B 51/306 53/551 |
| 2004/0250515 A1 * | 12/2004 | Rimondi ............... | B65B 9/073 53/451 |
| 2006/0016160 A1 | 1/2006 | Taylor | |
| 2010/0101193 A1 | 4/2010 | Iwasa et al. | |
| 2012/0261475 A1 * | 10/2012 | Bray ................... | B65B 9/20 235/462.32 |

FOREIGN PATENT DOCUMENTS

| | | | |
|---|---|---|---|
| AU | 2012258403 A1 | 6/2013 | |
| AU | 2012258495 A1 | 6/2013 | |
| AU | 2012258497 A1 | 6/2013 | |
| CA | 1330753 C | 7/1994 | |
| DE | 3626244 A1 | 2/1988 | |
| EP | 0 375 857 A1 | 7/1990 | |
| EP | 0375857 A | 7/1990 | |
| EP | 0479594 A2 | 4/1992 | |
| EP | 1344727 A2 * | 9/2003 | ............. G01M 3/36 |
| FR | 2740122 A1 | 4/1997 | |
| GB | 1234820 A | 6/1971 | |
| GB | 1256380 A | 12/1971 | |
| GB | 1274038 A | 5/1972 | |
| GB | 2490026 A | 10/2012 | |
| GB | 2497415 A | 6/2013 | |
| GB | 2497417 A | 6/2013 | |
| JP | S52-135375 A | 11/1977 | |
| JP | H05-4609 A | 1/1993 | |
| JP | H09-175514 A | 7/1997 | |
| JP | 2012-126447 A | 7/2012 | |
| WO | 2012/113010 A8 | 8/2012 | |
| WO | 2012/137912 A1 | 10/2012 | |
| WO | 2013/120836 A1 | 8/2013 | |

OTHER PUBLICATIONS

Search report from corresponding Spanish divisional application No. 201630979 dated Feb. 16, 2017 (four pages).
Combined Search and Examination Report dated Oct. 30, 2015 in GB Patent Application No. GB1518106.8, 8 pages.
Examination Report for British Application No. GB1416917.1 dated Oct. 30, 2015.
GB Patent Application No. 1518109.2, Combined Search and Examination Report dated Nov. 3, 2015, 6 pages.
GB Patent Application No. 1416917.1, Examination Report dated Feb. 5, 2016, 4 pages.
Search Report dated Mar. 10, 2015, from United Kingdom Patent Application No. GB1416917.1 (7 pages).

* cited by examiner

FILM DRIVE ASSEMBLY FOR A PACKAGING MACHINE

CROSS-REFERENCE TO RELATED APPLICATIONS

This application claims the priority of Australian Provisional Patent Application No. 2013904471, filed Nov. 19, 2013, and also claims the priority of Australian Provisional Patent Application No. 2013904995, filed Dec. 20, 2013, the disclosures of which are incorporated herein by reference.

FIELD

The present invention relates to film drive assemblies for packaging machines and more particularly but not exclusively to film drive assemblies that engage tubular bag material to move the tubular bag material past a former shoulder for delivery to the packaging machine.

BACKGROUND

Packaging machines receive bag material in tubular form. Product to be packaged is delivered to the interior of the tubular bag material, with the packaging machine then transversely sealing and cutting the tubular bag material to form bags of product. The tubular bag material is formed by a former, that provides the former shoulder to which packaging film is delivered in strip form. Formers and packaging machines are described in U.S. Pat. Nos. 4,910,943, 5,622,032, 4,663,917, 6,655,110, 7,159,376, 7,600,630, 7,383,672, 4,753,336, 7,124,559, 7,415,809, 7,152,387 and 7,472,528, and Australian Patent Applications 2012258403, 20122584, 2012258497, 2012201494 and 2012201595, and 2011360138, and International Application PCT/EP2013/052754.

The tubular material provided by the former shoulder is longitudinally sealed. This function is performed by heating the tubular bag material along its longitudinally overlapping edges and by applying pressure to the overlapping longitudinal edges.

Located above the former is a weighing machine that delivers batches of product to a sleeve that extends to the former, with an internal sleeve extending from the central opening of the former to a position adjacent or below the lower edge of the former.

The tubular bag material passes the former, is longitudinally sealed and then delivered to the packaging machine. While this is occurring batches of product are delivered to the interior of the tubular bag material by the weigher, the batches consisting of product scattered along a length of the tubular bag material. A film drive assembly is located below the former and above the packaging machine. The film drive assembly engages the tubular bag material to cause the strip material to pass over the former, and delivers the tubular bag material to the packaging machine below. Typically the film drive unit includes a pair of driven belts that drive the tubular bag material at a desired velocity. The packaging machine includes at least a pair of rotatably driven jaws, with the jaws having a peripheral speed (when engaged with the tubular bag material) that matches the velocity of the tubular bag material as determined by the film drive unit.

Product leaving the weighing machine, as mentioned above, is arranged in batches. It is not unusual for the batches to have a length of 100 ms when leaving the weighing machine. However the batches follow an arcuate path as they enter the former. This causes the product to impact against itself, and the internal surfaces of the tubular bag material. The result is that the product batches increasing in length. As an example the batch length may increase to 600 ms. To ensure the product is not located between the sealing jaws, in programming the packaging machine, it is assumed that the product batches have a length of about 650 ms.

The batches become elongated as the product falls through the former to the packaging machine below. The greater this fall length, the greater the batch elongation.

It is a disadvantage of known packaging assemblies that the packaging machines cannot operate at maximum speed due to undesirable batch elongation.

OBJECT

It is the object of the present invention to overcome or substantially ameliorate at least one of the above disadvantages.

SUMMARY

There is disclosed herein a film drive assembly to engage film material to move the material, the drive assembly including:

a loop drive belt having a drive surface to frictionally engage the material, the belt moving along a predetermined path including a generally linear first path portion along which the drive surface engages the material, the belt having a plurality of passages extending transversely through the belt from said surface;

a manifold to be subjected to a reduced air pressure and communicating with the passages for at least a part of said path portion so that the passages are subjected to a reduced air pressure so that a difference in air pressure across the material urges the material against said surface at said first path portion;

a drive pulley engaged with the belt to cause the belt to move along said path in a predetermined direction; and a plurality of belt engaging devices, with said belt passing between the a first one of engaging devices and a second one to said devices, to provide said first path portion, with the devices and pulley co-operating to provide a second path portion and a third path portion, with the second and third path portions relative to said first path portion having a direction of extension away from said first path portion.

Preferably, the second and third portions are linear.

Preferably, the assembly includes a heating bar at said first path portion to heat the bag material.

Preferably, said belt is a first belt, and said assembly includes a second belt, the second belt being generally parallel to the first belt at said first path portion and including a drive surface and a plurality of passages extending transversely of the second belt from the drive surface of the second belt, with the passages of the second belt communicating with the manifold so that the passages of the second belt are also subjected to a reduced air pressure to urge the bag material into engagement with the second belt.

Preferably, the second belt also passes around the drive pulley and a first and a second belt engaging devices.

Preferably, the first and second belt engaging devices are first and second idler rollers.

Preferably, the drive roller has a radius, and each of the idler rollers has a radius, with the drive roller radius being greater than the idler roller radius.

Preferably, the first idler roller is approximately vertically above the second idler roller.

Preferably, the second path portion extends between the second idler roller and the drive roller, with the second path portion extending generally horizontally.

Preferably, the drive assembly includes a further idler roller, the further idler roller urging the drive belt into engagement with the drive pulley.

There is further disclosed herein, in combination, a film drive assembly and a former shoulder;

the former shoulder providing a hollow and a former lower edge portion, with the former shoulder having an external surface that receives strip bag material to form the strip bag material into tubular bag material that is moved from the former shoulder in a predetermined direction;

the film drive assembly includes:

at least a pair of spaced rollers mounted for rotation about generally parallel axes, the rollers including an upper roller and a lower roller, with said upper roller at least partly projecting above said lower edge portion;

a driving belt that passes about the rollers so as to provide a belt drive portion, extending between the rollers, to engage the tubular bag material to move the tubular bag material in said direction, and wherein the drive portion extends generally parallel to said direction.

Preferably, the upper roller extends into said hollow.

Preferably, the combination includes a former providing the former shoulder, the former also providing a base plate to which the former shoulder is fixed so as to above the base plate, and wherein the rollers and belt form a first sub-assembly, and the film drive assembly includes a second sub-assembly, the second sub-assembly including;

at least a pair of spaced rollers mounted for rotation about generally parallel axes, the rollers of the second sub-assembly including an upper roller and a lower roller;

a drive belt passing about the rollers of the second sub-assembly so as to provide a belt drive portion, extending between the rollers of the second sub-assembly, to engage the tubular bag material to move the tubular bag material in said direction; and wherein the drive portions are generally parallel but transversely spaced and are to be located on opposite sides of the tubular bag material, with the upper rollers being located so as to at least partly project higher than the base plate.

There is further disclosed herein, in combination, a film drive assembly and a former, the former including:

a former shoulder providing a hollow and a surface that receives strip bag material to form the strip bag material into tubular bag material that is moved from the former in a predetermined direction, and a base plate to which the former shoulder is attached so that the former shoulder is at least substantially above the base plate;

the film drive assembly includes:

at least a pair of spaced rollers mounted for rotation about generally parallel axes, the rollers including an upper and a lower roller, with the upper roller at least partly projecting higher than the base plate, and a drive belt that passes about the rollers so as to provide a belt drive portion, extending between the rollers, to engage the tubular bag material to move the tubular bag material in said direction.

Preferably, the pair of spaced rollers is part of a first sub-assembly, and the film drive assembly includes a second sub-assembly, the second sub-assembly including:

at least a pair of spaced rollers mounted for rotation about a generally parallel axes, the rollers of the second sub-assembly including an upper roller and a lower roller;

a drive belt passing about the rollers of the second sub-assembly so as to provide a belt drive portion, extending between the rollers of the second sub-assembly, to engage the tubular bag material to move the tubular bag material in said direction; and wherein the drive portions are generally parallel but transversely spaced and are to be located on opposite sides of the tubular bag material, with the upper rollers being located so as to at least partly project higher than the base plate.

Preferably, said first sub-assembly is a rear sub-assembly, and said second sub-assembly is a front sub-assembly, with the front sub-assembly being positioned so as to be located adjacent overlapping longitudinal edge portions of the tubular bag material.

Preferably, the sub-assemblies are located on lateral sides of the tubular bag material so as to be both spaced from overlapping longitudinal edge portions of the tubular bag material.

Preferably, each sub-assembly includes a third roller, the third roller being spaced from the upper and lower rollers of the respective sub-assembly, with the third roller being drive pulley so as to drive the associated belt and being spaced laterally from the drive portion.

Preferably, the drive pulley of each sub-assembly has a radius larger than the upper and lower rollers of the respective sub-assembly.

Preferably, the above film drive assemblies are used with a packaging machine including rotatably driven sealing jaws.

There is further disclosed herein, in combination a film drive assembly and a packaging machine that receives tubular bag material from the film drive unit:

the film drive assembly including a plurality of rollers of which one is a drive pulley, a belt of loop configuration passing about the rollers so as to provide a belt drive portion that engages the tubular bag material to move the tubular bag material in a predetermined direction for delivery to the packaging machine:

the packaging machine including:

a pair of sealing jaws rotatably driven in unison through repeated revolutions in opposite angular directions, the jaws being driven about spaced generally parallel axes generally transverse relative to said direction so as to each have an angular velocity, with the sealing jaws engaging the tubular bag material to transversely seal the tubular bag material to form bags of product; and wherein there are motors operatively associated with the film drive assembly and the packaging machine to cause operation of the belt and sealing jaws, with the combination further including a control operatively associated with the motors to cause operation thereof, the control being operable so that the motors drive the belt and jaws so that the jaws when adjacent the tubular bag material can have a peripheral velocity less than the velocity of the belt being driven by the film drive assembly.

Preferably, the motors include servo motors, with at least one servo motor driving the drive pulley, and at least one servo motor driving the sealing jaws, with the control being a computer programmed to operate the servo motors so that belt provide the tubular bag material with a predetermined velocity, and the servo motor driving the sealing jaws is operated so that the sealing jaws can have a peripheral velocity less than said predetermined velocity.

In a further preferred form, said peripheral velocity can be in a direction opposite said predetermined direction.

BRIEF DESCRIPTION OF DRAWINGS

Preferred forms of the present invention will now be described by way of example with reference to the accompanying drawings wherein.

DESCRIPTION OF EMBODIMENTS

Figure 1:
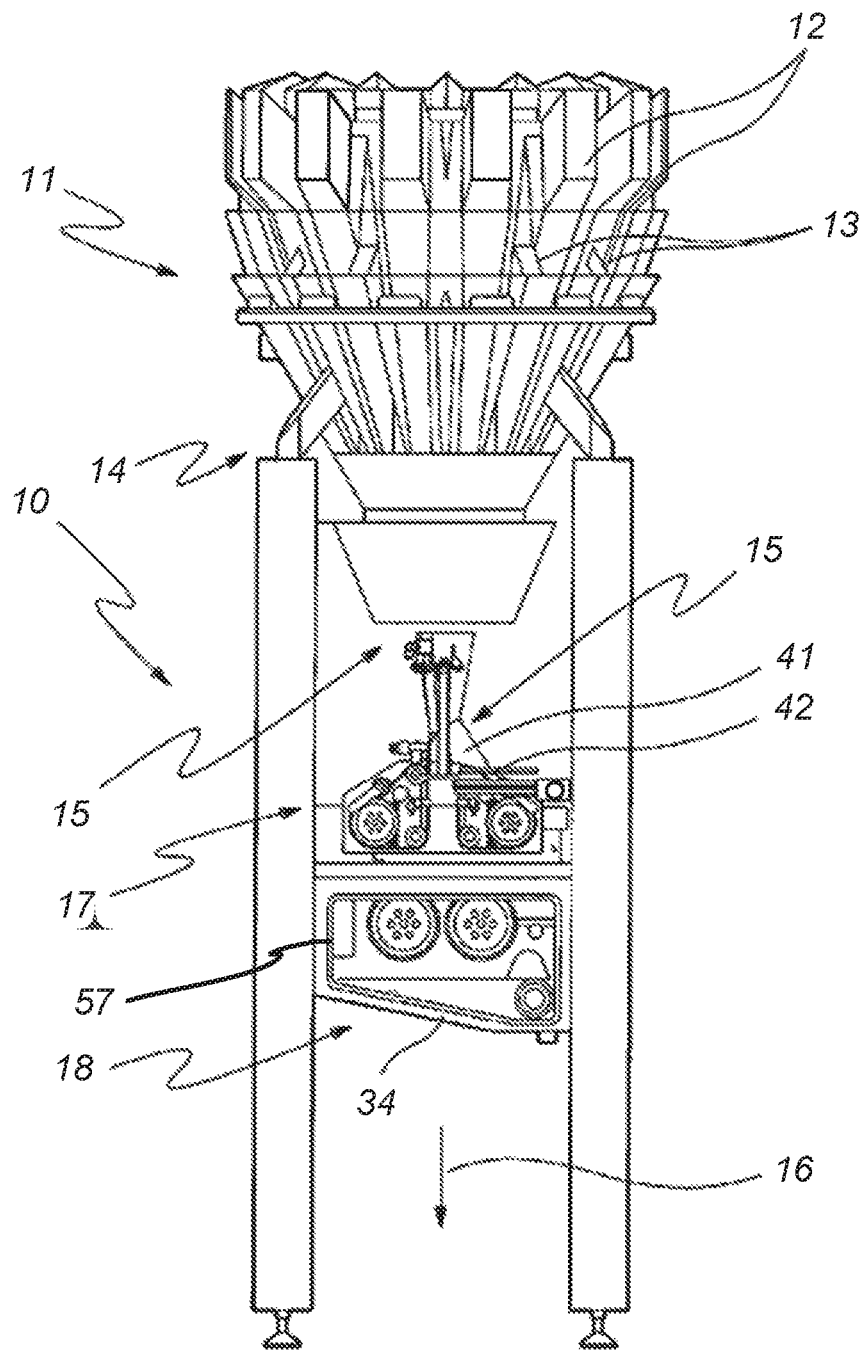
FIG. 1 is a schematic side elevation of a packaging assembly.
Figure 2:
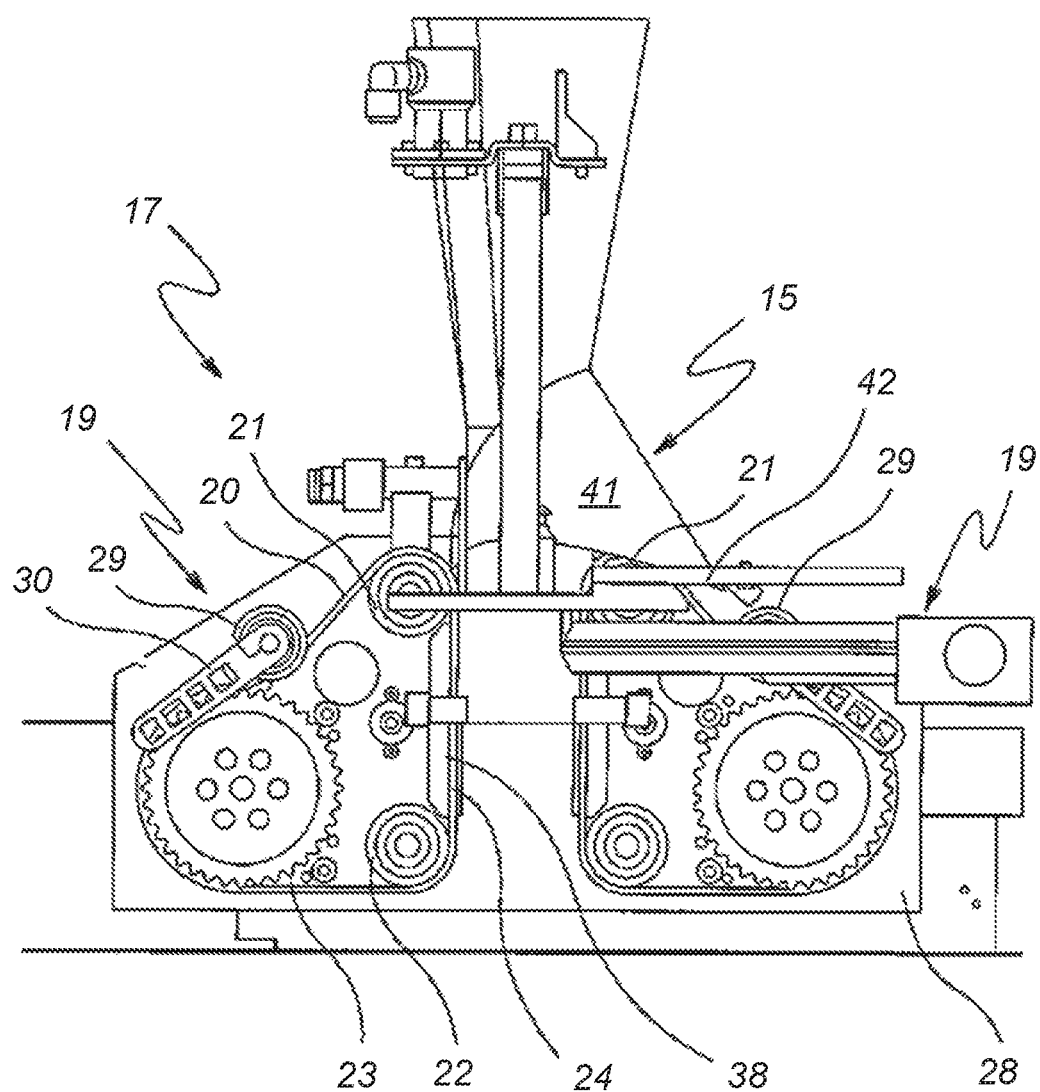
FIG. 2 is a schematic side elevation of the drive assembly of the packaging assembly of FIG. 1.

In the accompanying drawings there is schematically depicted a packaging assembly 10. The assembly 10 includes a weighing machine 11 that includes a plurality of buckets 12 and 13 to which product is delivered from above, with the buckets 12 and 13 being operated to deliver batches of product to a chute 14. The chutes 14 deliver the batches of product to a former 15. The former 15 has a former shoulder 41 that receives strip bag material, and transforms the strip bag material into a tubular configuration that passes in the direction 16. The strip bag material engages the external surface of the former shoulder 41 to be configured into the tubular form. The tubular bag material passes downwardly through the upper opening 53 of the former shoulder 41. The direction 16 is generally vertically downward.

The tubular bag material 27 is engaged by a film drive assembly 17 that pulls the strip material past the former shoulder 41, and delivers the tubular bag material 27 to the packaging machine 18 below.

Figure 4:
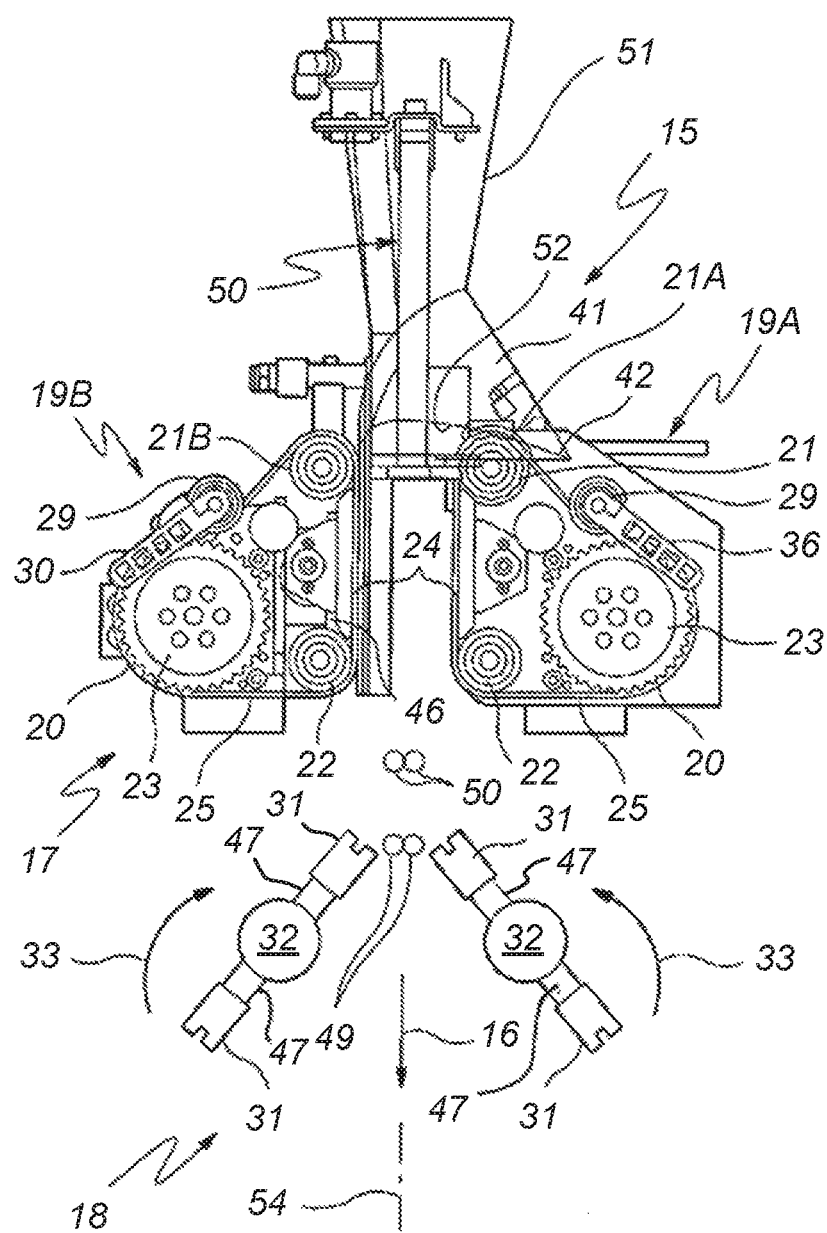
FIG. 4 is a schematic further side elevation of the drive assembly of FIG. 2.
Figure 5:
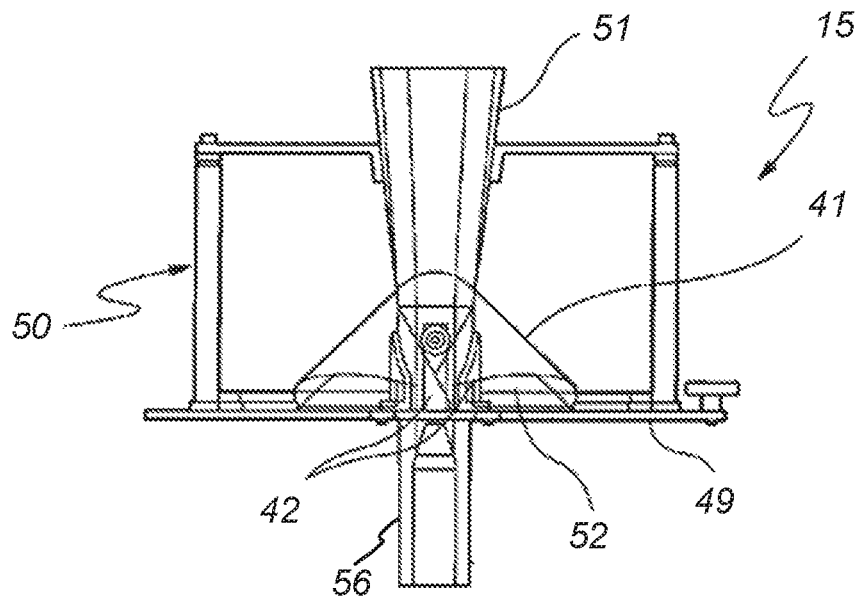
FIG. 5 is a schematic front elevation of the former illustrated in FIGS. 1 and 2.
Figure 6:
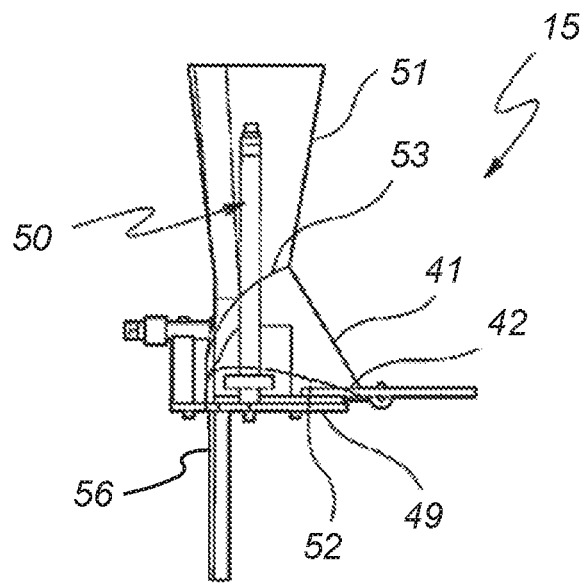
FIG. 6 is a schematic side elevation of the former as shown in FIG. 5.

Particularly as described in U.S. Pat. No. 4,663,917, the packaging machine 18 includes pairs of rotatably driven sealing jaws 31 that are rotatably driven about generally parallel but transversely spaced axes through repeated revolutions in the angular directions 33. Mounted with the sealing jaws 31, as described in U.S. Pat. No. 4,663,917, are cooperating pairs of stripper bars 49 and closer bars 50 (see FIG. 4).

The former 15 has the former shoulder 41 as describe above, and a former base plate 49. The former shoulder 41 is mounted on the base plate 49 so as to be supported thereby. Also attached to the base plate 41 is a frame 50 that secures the chute 51 to the base plate 49. Also mounted on the base plate 49 is a backing bar 55. Both upper rollers 21 are positioned so as to at least partly project above the base plate 49.

The drive assembly 17 includes a pair of sub-assemblies 19, the sub-assemblies 19 being located on opposite sides of the tubular bag material 27 and both engage the tubular bag material 27 to pull the tubular bag material 27 through the assembly 10. Preferably, the sub-assembly 19A is a rear sub-assembly and the sub-assembly 21B is a front sub-assembly, with the sub-assembly 21B engaging the tubular bag material adjacent the longitudinally overlapping edge portions of the tubular bag material. In an alternative embodiment, the sub-assemblies 19, while engaging opposite portions of the tubular bag material, engage the tubular bag material on the lateral sides of the tubular bag material, that is the sub-assemblies 19 are both spaced from the overlapping longitudinal edge portions of the tubular bag material. More particularly the sub-assemblies 19 would be displaced 90° about the axis 54. The axis 54 is a generally upright central axis of the packaging machine 18 and former 15.

Each sub-assembly 19 includes a belt 20 that passes between a first idler roller (pulley) 21, a second idler roller (pulley) 22 and a drive pulley (roller) 23. The length of belt 20 passing between the idler rollers 21 and 22 provides a belt drive portion 24 that is generally linear and parallel to the direction 16. The portion 24 moves in the direction 16 so as to move the tubular bag material in the direction 16. The drive portion 24 is substantially vertical as the roller 21 is essentially vertically above the roller 22.

The belt 20 passes from the idler roller 22 to the drive pulley (roller) 23 so as to provide second belt portion 25. The belt portion 25 is generally horizontal, that is generally perpendicular (transverse) relative to the direction 16. The belt 20 passes about the pulley 23 to the idler roller 21 so as to provide a belt portion 35. The pulley 23 is spaced laterally from the portion 24.

The belt portion 24 follows a linear path generally parallel to the direction 16 and direction of extension of the tubular bag material 27. The belt portion 25 follows a generally linear path extending away from the tubular bag material 27 (and portion 24), so as to have a direction of extension away from the portions 24. The belt portion 35 has a direction of extension away from the belt portion 24. Preferably, the portion 25 is perpendicular to the portion 24.

The belt 20 passes in the direction 26 about the idler rollers 21 and 22 and drive pulley 23. The two belt portions 24 are generally parallel co-extensive but transversely spaced so as to be on opposite sides of the tubular bag material 27.

The drive pulleys 23 are driven by a control and motor assembly 28 so as to provide the tubular bag material 27 with a desired velocity profile. As mentioned previously, the tubular bag material 27 is driven in the direction 16. However in a further preferred form the control and motor assembly 43 may vary the velocity in the direction 16, and more preferably can reverse movement of the tubular bag material 27, so that for one or more short periods of time the tubular bag material 27 is slowed or even moves in a direction opposite the direction 16. This movement causes the tubular bag material 27 to vibrate, aiding in causing the product to settle towards the lower end of the bag being formed. The control and motor assembly 28 would include a computer controlled servo motor 56 or motors 56 for the pulley 23.

The abovementioned sub-assemblies 19 provide a particular advantage in that the idler rollers 21 and 22 are of a small diameter than the drive pulley 23, which in turn enables the distance between the former 15 and packaging machine 18 to be reduced. This reduced length minimises the length of which the product batches can elongate. This in turn enables the machine 18 to be operated at a higher speed, therefore providing for an increase in the number of bags produced per minute. The smaller rollers 21 and 22 also provides the advantage of enabling the length of the belt 20 (belt portion 24) to be reduced, again reducing the distance between the former 15 and packaging machine 18.

The belts 20 of the above described preferred embodiment, each have passages 40 extending transversely through the belt 20, with the passages 40 communicating with a manifold 28. Reduced air pressure is delivered to the manifolds 38, with the result that a reduced pressure is applied to the passages 40 extending transversely through the belt, thereby urging the tubular bag material 27 into contact with the first belt portions 24. In particular the manifolds 38 would communicate with the passages along the first belt portion 24. To sealingly secure together the longitudinal edge portions of the bag material (to form the tubular bag material 27, there is provided a heating bar (sealing) 46. Preferably there is further provided a third idler roller 29 that is mounted on a pivotally movable arm 30 so that the roller 29 is urged in contact with the belt 20 which in turn urges the belt 20 into contact with the drive pulley 23.

Preferably, the idler rollers 21 and 22 have generally parallel rotational axes that are transverse relative to the direction 16, while the idler rollers 21 and 22 have axes that are generally parallel to the rotational axes of the drive pulleys 23.

In the embodiment of FIGS. 1, 2 4, 5 and 6, the upper roller 21A projects at least partly above the lower edge portion 42 of the former shoulder 41, and is at least partly located in the cavity 52. This has the specific advantage of reducing the distance between the former 41 and the packaging machine 18, thereby minimising batch elongation.

In the embodiment of FIGS. 1, 2, 4, 5 and 6, the upper roller 21B projects at least partly above the base plate 49. This provides the specific advantage of reducing the distance between the former shoulder 41 and the packaging machine 18. By minimising this distance, batch elongation is also minimised. Still further to this, a further advantage is provided by the upper roller 21A also being at least partly located above the base plate 49, again enabling the distance between the former shoulder 41 and the packaging machine 18 being reduced.

Figure 3:
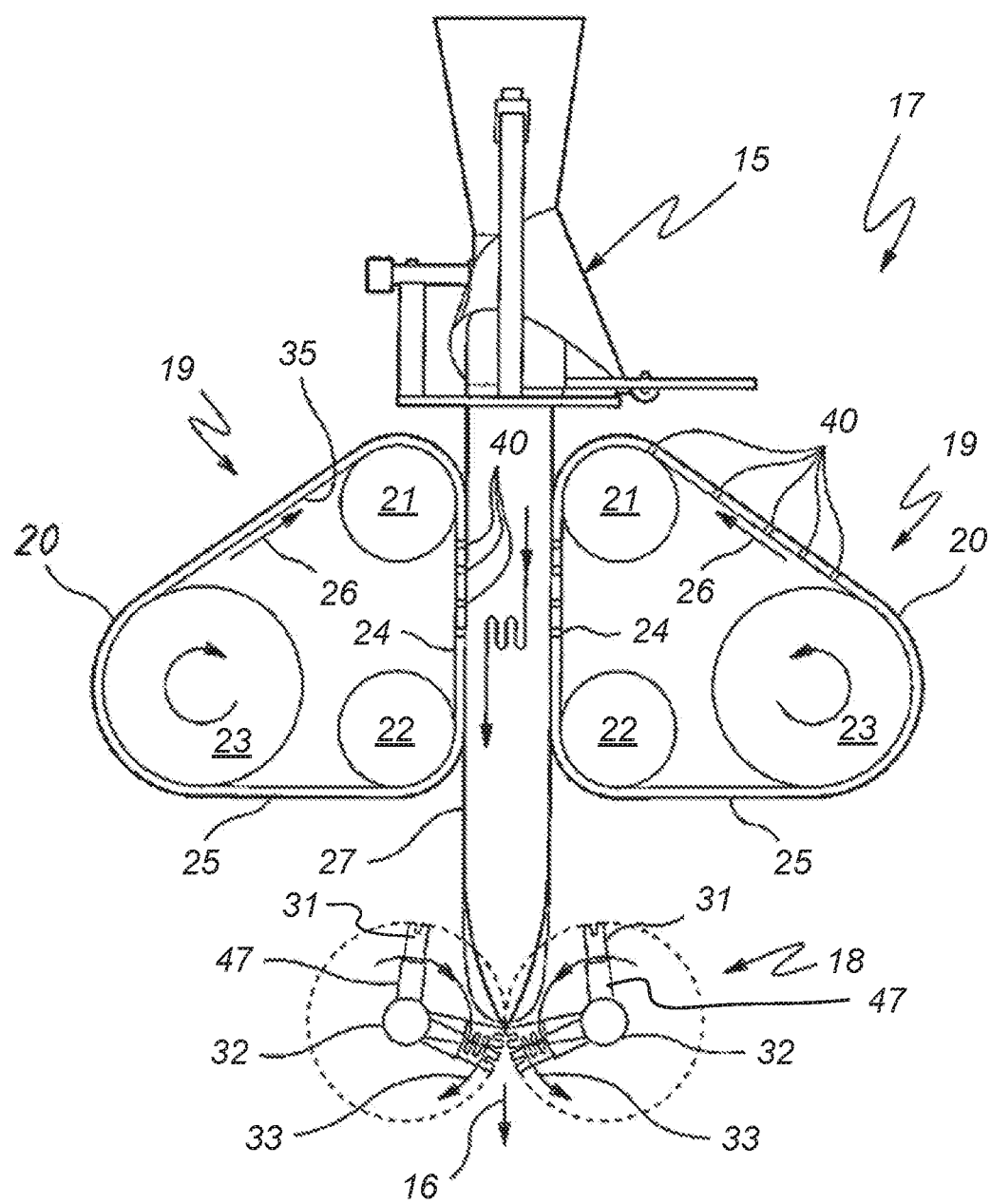
FIG. 3 is a schematic side elevation of a modification of the drive assembly as shown in FIG. 2.

In the embodiment of FIG. 3, the upper rollers 21 have been removed from projecting above the lower edge portion 42. However it should be appreciated that in respect of the embodiments of FIG. 3, the upper rollers 21 could be reduced in size and moved upward so as to be located at least partly in the hollow 45 provided by the former shoulder 41, that is at least partly projecting above the lower edge portion 42.

Each of the jaws 31 is mounted on a shaft 32 by means of jaw supports (arms) 47, with the shafts 32 being rotatably driven in opposite angular directions 33. Accordingly the sealing jaws 31 are driven through repeated revolutions in synchronism about spaced generally parallel axes, the axes being generally transverse of the direction 16. The sealing jaws 31 engage the tubular bag material 27, transversely seal the bag material 27, and cut the bag material 27 to form discrete bags.

The shafts 32 are driven by control and a motor assembly 34, with the assembly 44 being operable to cause the shafts 32 to have a desired angular velocity profile. Preferably the control and motor assembly 34 is operable so that the jaws 31 have a peripheral velocity, when adjacent each other, to engage with the tubular bag material 27, that is less than the velocity of the tubular bag material 27 at the belts 24. In a further preferred form, the jaws 31 when adjacent each other, to engage the tubular bag material 27, can for one or more short periods of time reverse so as to move in a direction opposite the rotational direction 33. This operation of the sealing jaws 31 aids in causing the product to settle towards the lower end of the bag being formed. By urging the product towards the lower end of the bag being formed, the chance of product being engaged between the sealing jaws 31 is reduced. This also aids in increasing bag production rates. However when the jaws 31 are engaged with the bag material 27 to form a seal therein, the jaws 31 have the same velocity as the bag material 27 between the jaws 31. Accordingly the bag material 27, by moving with the jaws 27, changes in velocity.

The control and motor assembly 34 would include a computer and a servo motor or motors 57 for the shaft 32, with the computer programmed to operate the servo motor or motors 57 to produce the desired velocity profile.

The control and motor assembly 18, and the control and motor assembly 34, may share a computer that controls operation of the servo motors 56, 57 that drive the drive pulleys 23 and the shafts 32, so that the sealing jaws 31 are coordinated with the speed of the tubular bag material 27. However it should also be appreciated that the computer could control the servo motors so that the sealing jaws 31 have a peripheral speed, when adjacent or engaged with the tubular bag material 27, that is different from the velocity provided to the tubular bag material 27 by the belt 20. For example, the jaws 31, and bag material 27 engaged therewith, may have a slower velocity causing product to settle towards the lower end of the bag, with the jaws 31 then increasing in speed when the transverse seal is to be formed in the bag. In another embodiment the jaws 31 may have a velocity opposite the direction of movement of the tubular bag material 27 when the jaws 31 are adjacent the material 27.

The above embodiments have the advantage of urging the product towards the lower end of the bag being formed. This is done by changing the velocity of the bag material 27. This change in velocity vibrating the bag material 27 enables the bags to be more rapidly produced.

The invention claimed is:

1. In combination, a former including a former shoulder and a base plate to which the shoulder is attached to support the former shoulder, and a film drive assembly to engage tubular film material to move the material downwardly to a packaging machine, the film drive assembly including:
    a pair of loop drive belts, each loop drive belt having a drive surface and a plurality of passages extending transversely through the loop drive belt from its drive surface, each loop drive belt being configured to move along a predetermined path that includes a generally linear first path portion along which the drive surface frictionally engages the tubular film material;
    a manifold for each belt communicating with the passages for at least a part of said first path portion of each belt to subject the passages to a reduced air pressure to urge the tubular film material against the drive surfaces at the first path portions;
    a pair of drive pulleys, each drive pulley being engaged with a respective drive belt to drive it along the predetermined path in a predetermined direction; and
    a plurality of idler rollers including a first upper idler roller and a second lower idler roller associated with each drive belt such that each drive belt extends over a first upper idler roller and a second lower idler roller to provide the first path portion, wherein the second lower idler roller and the drive pulley provides a second path portion and, the drive pulley and the first upper idler roller provides a third path portion, the drive pulleys being positioned so that the second and third path portions of each belt extending in a direction away from said first path portion of said loop drive belt; and wherein
    the first upper idler rollers are least partly projecting higher than at least a portion of the base plate so that a distance between the former shoulder and packaging machine to which the tubular film material is moved by the film drive assembly is reduced.

2. The combination of claim 1, wherein the second and third portions are linear.

3. The combination of claim 2, wherein the assembly includes a heating bar at one of the first path portions to heat the tubular material.

4. The combination of claim 3, wherein each drive pulley has a radius, and each of the idler rollers has a radius, with each drive pulley radius being greater than each idler roller radius.

5. The combination of claim 4, wherein each first idler roller is approximately vertically above the respective second idler roller.

6. The combination of claim 5, wherein each second path portion extends between the second idler roller and the drive pulley thereof, with the second path portion extending generally horizontally.

7. The combination of claim 5, wherein the drive assembly includes further idler rollers, the further idler rollers urging the drive belts into engagement with the drive pulleys.

8. The combination of claim 1, wherein the assembly includes a heating bar at one of the first path portions to heat the tubular material.

9. The combination of claim 8, wherein each drive pulley has a radius, and each of the idler rollers has a radius, with each drive pulley radius being greater than each idler roller radius.

10. The combination of claim 9, wherein each first idler roller is approximately vertically above the respective second idler roller.

11. The combination of claim 9, wherein each second path portion extends between the second idler roller and the drive pulley thereof, with the second path portion extending generally horizontally.

12. The combination of claim 11, wherein the former shoulder has a former lower edge, with one of the upper rollers at least partly projecting above said former lower edge.

13. The combination of claim 9, wherein the drive assembly includes further idler rollers, the further idler rollers urging the drive belts into engagement with the drive pulleys.

14. In combination, the film drive assembly of claim 13, wherein the former shoulder has a former lower edge, with one of the upper rollers at least partly projecting above said former lower edge.

15. The combination of claim 14, wherein the belts have a velocity and the combination further includes a motor or motors operatively associated with the film drive assembly and jaws to cause operation thereof so that when the jaws are adjacent each other, the jaws engage the tubular bag material and have a peripheral velocity less than the velocity of the belts.

16. The combination of claim 9, wherein the former shoulder has a former lower edge, with one of the upper rollers at least partly projecting above said former lower edge.

17. The combination of claim 16, wherein the belts have a velocity and the combination further includes a motor or motors operatively associated with the film drive assembly and jaws to cause operation thereof so that when the jaws are adjacent each other, the jaws engage the tubular bag material and have a peripheral velocity less than the velocity of the belts.

18. In combination, the film drive assembly of claim 1, wherein the former shoulder has a former lower edge, with one of the upper rollers at least partly projecting above said former lower edge.

19. The combination of claim 18, wherein the belts are driven at a velocity, and the combination further includes a motor or motors operatively associated with the film drive assembly and jaws to cause operation thereof so that when the jaws are adjacent each other, the jaws engage the tubular bag material and have a peripheral velocity less than the velocity of the belts.

* * * * *